May 18, 1954     H. E. JENSEN     2,678,960
BATTERY TERMINAL POST MOUNTING
Filed March 3, 1953
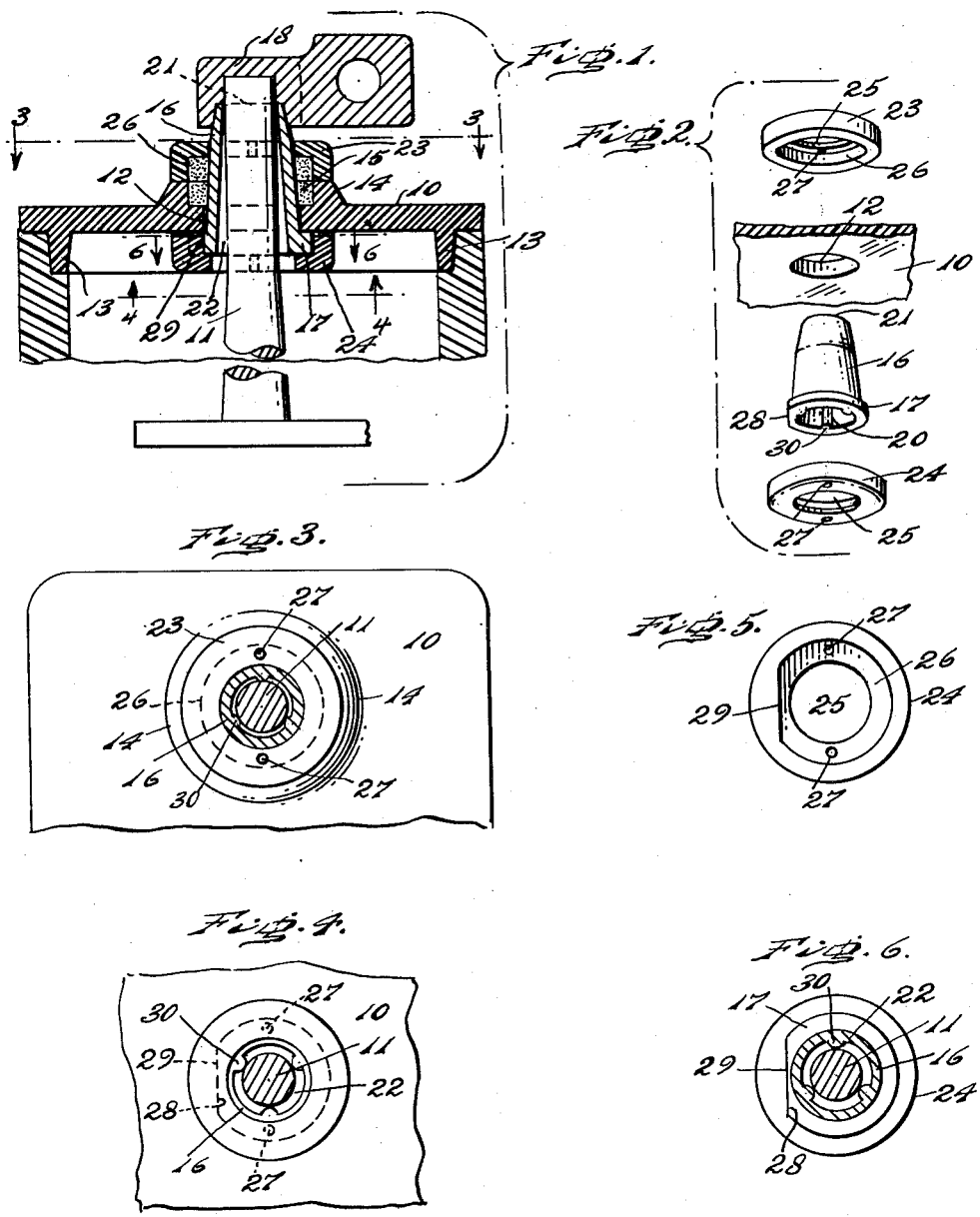
INVENTOR
Henry E. Jensen,
BY
Robert M. Barr
ATTORNEY.

Patented May 18, 1954

2,678,960

UNITED STATES PATENT OFFICE 2,678,960

BATTERY TERMINAL POST MOUNTING

Henry E. Jensen, Norristown, Pa., assignor to C & D Batteries, Inc., Conshohocken, Pa., a corporation of Pennsylvania Application March 3, 1953, Serial No. 339,970

9 Claims. (Cl. 136—135)

The present invention relates to storage batteries and more particularly to the mounting of terminal posts in plastic covers for the cases of such batteries.

Since plastic is now being extensively used in the manufacture of storage battery cases and the covers therefor, a problem has arisen regarding the mounting of terminal posts in the plastic cover. In terminal posts as heretofore assembled in a battery cover it is conventional to provide the post with a flange which seats against the inner face of the cover and which coacts with an external nut seating upon the outer face of the cover as a clamp. This usual construction has been found impractical with plastic covers because the cast post flange varies vertically relative to the plane of the top of the case. Thus, in one instance it may take its position spaced below such plane and consequently when the cover is placed upon the case it fails to seat upon the flange so when the nut is drawn tight the cover is bent inwardly to its fixed position. Again the flange may be so high as to cause distortion of the cover in the opposite direction when the clamp is applied. Either of these contingencies places a plastic cover under such severe strains as to cause crazing of the plastic or distortions of a weakening nature.

An object of the present invention is to provide a terminal post mounting for plastic battery covers which can be assembled without distorting the cover.

Another object is to provide a terminal post mounting wherein the terminal post has no parts inside of the battery case to contact the cover.

Another object is to provide a terminal post mounting wherein plastic retaining means are bonded to the plastic cover.

A further object is to provide a terminal post mounting wherein a tubular lead insert forms a sleeve about the post and which is locked in place by plastic rings bonded as an integral part of the plastic cover.

A still further object is to provide a terminal post mounting wherein means are provided to prevent turning of the post under torsional strains.

Further objects will appear hereinafter.

In the accompanying drawings Fig. 1 represents a sectional elevation of a terminal mounting embodying one form of the present invention; Fig. 2 represents an exploded view of the associated parts; Fig. 3 represents a section on line 3—3 of Fig. 1; Fig. 4 represents a section on line 4—4 of Fig. 1; Fig. 5 represents a plan of either of the retaining rings; and Fig. 6 represents a section on line 6—6 of Fig. 2.

Referring to the drawings, one form of the present invention is shown for association with a plastic battery cover 10 as a sealed mounting for a lead terminal post 11. As illustrative of the invention, only that portion of the cover 10 is shown which includes one of the terminal post holes 12, and which can be considered either the positive or negative post, since the mounting is the same for each. The post 11 traverses the cover post hole 12 to protrude above the cover 10 for attachment of the usual lead cable connector. Also, it should be noted that the post hole 12 has a diameter greater than that of the post 11 to provide a circumferential space to receive a tubular lead insert to be hereinafter described. Furthermore, that portion of the terminal post 11 below the cover and within the battery case is formed without the usual lateral flange normally abutting the inner face of a cover as part of the means for clamping it in place to the cover. In accordance with the present invention the post to which the mounting of the invention is applied has no part contacting the plastic cover. The cover 10 is formed or molded of synthetic plastic, such as polystyrene and is dimensioned to seat marginally upon the top of the battery case where it is sealed by a depending marginal rib 13, which seats upon an internal marginal recess of the battery case and is hermetically sealed by binding the cover and case together with a suitable plastic cement or heat seal. As shown, the upper face of the cover 10 is formed with an upstanding annular flange 14 concentrically encircling the post hole 12 but of larger diameter to form an annular channel 15 of L-shaped section.

As an associated part of the post mounting means, a tubular lead insert 16 is provided having an external circumferential flange 17 at one end to seat against the inner face of the cover 10 while its body part traverses the post hole 12 with a close fit, to terminate adjacent to the protruding end of the post 11. Externally that portion of the insert 16 above the flange 17 tapers convergingly upward to provide a protruding end portion dimensioned for a tight fit with a terminal lug 18 seated thereabout in lead burned relation. Internally the bore 20 of the insert 16 tapers convergingly upwardly from the flanged end to provide an end opening 21 to encircle the protruding end of the post 11 with a snug fit in order to be lead burned thereto. The lower large end of the bore 20 is of greater diameter than the encircled part of the post 11 so that the resulting assembly has a clearance 22 between the post 11 and the insert 16 which gradually widens towards the inside of the battery case. This clearance functions to discharge any material tending to grow by chemical action.

In order to attach the insert 16 to the cover 10 and thus permanently lock the post 11 to the cover 10, two retaining cup-shaped rings 23 and 24 are provided and function at opposite sides of the cover 10 to lock the insert 16 and its united post 11 to the cover. For ease in assembly and for economy reasons, the two rings are interchangeable, each being a duplicate of the other. By reason of the cup-shape, each ring forms a hole 25 opening into a larger diameter depressed cavity 26 dimensioned for alternate functions according to whether it is used as the outside or inside ring with respect to the cover. In the former instance, the ring diameter corresponds to the diameter of the rib 13 in order to seat thereon, whereupon the cavity 26 alines with the channel 15 to form a relatively large circumferential groove for the reception of a suitable sealing grease, which, after assembly, can be pressure injected through holes 27 in the ring. The contacting faces of the ring and the rib are then bonded together by a plastic cement or by heat sealing so that the ring becomes an integral part of the cover 10. Also, when so united, the hole 25 has a snug fit against the outer face of insert 16. The duplicate ring, when in place abutting the inside of the cover, seats the insert flange 17 snugly in the cavity 26 while its hole 25 registers with the insert bore 20 as a continuation of the clearance 22 about the post 11. The abutting face of the ring is bonded to the inside of the cover by a plastic cement or by heat sealing, in order to become an integral part of the cover and also to interlock with the insert flange 17 as a retaining means.

To guard the mounted assembly against relative turning due to torsional strains, frequently caused by the attachment of a cable clamp, a plane surfaced flat 28 is formed on the periphery of the flange 17 for mating relation with a complemental segment flat 29, across the cavity 26 in the retaining ring to be associated therewith. By this construction the post 11 and the insert 16 are anchored in the integral plastic rings and case, thereby preventing relative turning of the post due to external torsional forces.

In assembling the mounting, the cover is inverted to permit the insert 16 to be passed through a post hole so that its flange 17 seats against the inner face of the cover 10. Either ring 23 or 24 is now put in place with insert flange 17 seated in the cavity 26 and with the two flats 28 and 29 juxtaposed. The ring is now bonded to the cover by a plastic cement or by heat sealing. The cover 10 is now turned over, placed upon the top of the case with a post 11 telescoped within the insert 16. The other ring is now seated upon the cover flange 14 encircling the protruding end of the insert 16, and bonded to the outer face of the cover 10. The protruding ends of the post 11 and the insert 16 are now lead burned together, sealing the upper end of the clearance 22 to the atmosphere. A grease gun now extrudes sealing grease through the holes 27 to fill the channel 15. The cable attaching lug 18 is now lead burned to the end portion of the insert 16.

From the foregoing it will be seen that the two plastic rings 23 and 24 have now become an integral part of the cover 10 and coact with the novel insert to form a stable, effective mounting for the terminal post 11. Since the post 11 has no parts in the path of the cover as it is lowered into place on the battery case, any variation in the length of the post cannot obstruct mounting the cover in a true horizontal undistorted plane. Also, it should be noted that the insert 16 is formed internally with circumferentially spaced ribs or beads 30 extending lengthwise of the bore 20 and functioning to contact the post 11 to assure proper alinement between the parts.

Having thus described my invention, I claim:

1. A battery post mounting comprising the combination of a plastic battery cover having a post hole, a lead terminal post traversing said hole and protruding above said cover, said post having a diameter less than the diameter of said hole to provide a circumferential space, a tubular lead insert traversing said space to protrude through above said cover and encircling said post to form clearance, the outer end of said insert being lead burned to said post to seal said clearance to the atmosphere, a circumferential flange on the inner end of said insert seated against the inner face of said cover, a cup-shaped plastic ring internally seating said flange and in contact with the inner face of said cover, means integrally bonding said ring to said cover, a second plastic ring encircling said insert in contact relation and seated on the outer face of said plastic cover, means integrally bonding said second ring to said cover, and packing means between said second ring and said insert.

2. A battery post mounting in accordance with claim 1 wherein means are provided to prevent the mounted post from turning due to externally applied torsional force.

3. A battery post mounting in accordance with claim 1, wherein the second plastic ring is cup-shaped to form an annular cavity for the packing means.

4. A battery post mounting in accordance with claim 2 wherein said preventing means comprises complemental contacting flat segments respectively on said flange and said first plastic ring.

5. A battery post mounting in accordance with claim 3 wherein the two rings are interchangeable for assembly purposes.

6. A battery post mounting comprising the combination of a plastic battery cover having a post hole to encircle the protruding end of a terminal post with an annular space therebetween, a tubular lead insert traversing said space with its protruding end integrally connected to said post, a circumferential flange on the inner end of said insert abutting the inner face of said cover, said flange having a flat segment, a cup-shaped plastic ring internally seating said flange and having a flat segment complemental to said flange segment, means integrally bonding said ring to the inner face of said cover, and a second plastic ring encircling the protruding end of said insert in contact relation, and means integrally bonding said second ring to the outer face of said plastic cover.

7. A battery post mounting in accordance with claim 6 wherein packing means seals the joint between said second ring and said insert.

8. A battery post mounting in accordance with claim 7 wherein said insert and said first plastic ring provide a clearance about said post opening into the interior of the battery case.

9. A battery post mounting in accordance with claim 8 wherein beads are disposed in the clearance to center and prevent displacement of said post.

References Cited in the file of this patent

UNITED STATES PATENTS

| Number | Name | Date |
|---|---|---|
| 1,411,414 | Cook | Apr. 4, 1922 |
| 1,460,895 | Doughty et al. | July 3, 1923 |
| 1,608,166 | Cole | Nov. 23, 1926 |

FOREIGN PATENTS

| Number | Country | Date |
|---|---|---|
| 285,501 | Great Britain | May 17, 1928 |
| 321,681 | Great Britain | Nov. 15, 1929 |